United States Patent [19]

Hannah

[11] Patent Number: 5,706,054
[45] Date of Patent: Jan. 6, 1998

[54] METHOD AND APPARATUS FOR ADJUSTING VIDEO DATA TO LIMIT THE EFFECTS OF AUTOMATIC FOCUSING CONTROL ON MOTION ESTIMATION VIDEO CODERS

[75] Inventor: Eric C. Hannah, Pebble Beach, Calif.

[73] Assignee: Intel Corporation, Santa Clara, Calif.

[21] Appl. No.: 566,015

[22] Filed: Dec. 1, 1995

[51] Int. Cl.$^6$ ............................ H04N 5/232; H04N 7/12
[52] U.S. Cl. ..................... 348/402; 348/220; 348/409; 348/401; 348/412; 348/208; 348/352; 382/236; 382/205
[58] Field of Search ........................ 382/199, 205, 382/236; 348/208, 352, 409, 401, 402, 412, 220; H04N 5/228, 5/225, 7/12, 11/02, 11/04

[56] References Cited

U.S. PATENT DOCUMENTS

| | | | |
|---|---|---|---|
| 4,837,632 | 6/1989 | Kubo et al. | 348/208 |
| 4,849,810 | 7/1989 | Ericsson | 358/133 |
| 4,998,162 | 3/1991 | Kondo | 358/41 |
| 5,016,107 | 5/1991 | Sasson et al. | 358/209 |
| 5,019,901 | 5/1991 | Uomori et al. | 358/105 |
| 5,065,246 | 11/1991 | Takemoto et al. | 358/227 |
| 5,107,293 | 4/1992 | Sekine et al. | 348/208 |
| 5,126,841 | 6/1992 | Tanaka et al. | 358/105 |
| 5,142,380 | 8/1992 | Sakagami et al. | 358/432 |
| 5,150,209 | 9/1992 | Baker et al. | 358/133 |
| 5,151,784 | 9/1992 | Lavagetto et al. | 358/136 |
| 5,173,773 | 12/1992 | Ueda et al. | 358/136 |
| 5,198,896 | 3/1993 | Kondo et al. | 348/208 |
| 5,198,901 | 3/1993 | Lynch | 358/105 |
| 5,251,028 | 10/1993 | Iu | 358/133 |
| 5,259,040 | 11/1993 | Hanna | 382/54 |
| 5,274,453 | 12/1993 | Maeda | 348/409 |
| 5,309,243 | 5/1994 | Tsai | 348/221 |
| 5,329,318 | 7/1994 | Keith | 348/699 |
| 5,357,281 | 10/1994 | Ikeda et al. | 348/401 |
| 5,384,595 | 1/1995 | Sakaguchi | 348/208 |
| 5,414,464 | 5/1995 | Sasaki | 348/222 |
| 5,416,520 | 5/1995 | Kuzma | 348/409 |
| 5,430,480 | 7/1995 | Allen et al. | 348/208 |
| 5,436,666 | 7/1995 | Astle | 348/416 |
| 5,521,634 | 5/1996 | McGary | 348/169 |

FOREIGN PATENT DOCUMENTS 0514167  11/1992  European Pat. Off. .

Primary Examiner—Tommy P. Chin
Assistant Examiner—Diep Nhon Thanh
Attorney, Agent, or Firm—William H. Murray

[57] ABSTRACT

A method, and computer program are provided for adjusting motion estimation video data to remove unwanted data generated by an automatic focusing control (AFC) circuit on the video data recorder. One or more edges or fine points in a sequence of motion compensated images is identified. Difference frames composed of pixel differences are generated from the motion compensated images. The difference frames are examined for evidence of AFC action. In the event AFC action is identified, one or more frames of the sequence of difference frames are filtered to remove the AFC effects. The filtered difference frames are encoded. Identification can be made by detecting a component of oscillation in a comparison of summed pixel differences of a sequence of frames. The difference frames may be filtered by reducing the energy level of one or more of the difference frames or by discarding one or more of the difference frames.

39 Claims, 5 Drawing Sheets

METHOD AND APPARATUS FOR ADJUSTING VIDEO DATA TO LIMIT THE EFFECTS OF AUTOMATIC FOCUSING CONTROL ON MOTION ESTIMATION VIDEO CODERS

BACKGROUND OF THE INVENTION

1. Field of the Invention

This invention relates to the field of video processing and more particularly to motion estimation used in video compression.

2. Description of the Related Art

Motion estimation is commonly used by video encoders that compress successive frames of digital video data ("video frames"). When video frames are to be transmitted via a communication medium of limited bandwidth, or are to be stored in a storage medium having limited storage capacity, it often is desirable to compress the digital data which represents each frame, so as to reduce the amount of data that needs to be transmitted or stored.

Motion estimation and motion compensation exploit the temporal correlation that often exists between consecutive video frames. For block-based motion estimation, each input frame is divided into blocks and motion estimation is performed on each block relative to blocks in a reference frame (block matching) to generate a motion vector for each block. These motion vectors are then used to assemble a motion compensated frame. Any difference between the motion compensated frame and the input frame is represented by difference data. Since motion vectors and difference data are typically represented with fewer bits than the pixels that comprise the original image, fewer bits need to be transmitted (or stored) in order to represent the input frame. In some conventional video encoders, the motion vectors (and difference data) are further encoded to generate an encoded bitstream for the video sequence. It is preferred that block matching be accurate, as this will tend to minimize the magnitude of the motion vectors and, especially, the amount of difference data.

A reference frame can be the previous motion compensated frame or a "key" frame, which is an actual frame of video not compressed by motion estimation processing. Many conventional video encoders are designed to transmit a key frame at predetermined intervals, e.g. every 10th frame, or at a scene change.

Often, motion vectors are very similar from block to block. In an ideal video encoding system, during slow camera panning of a static scene, all of the motion vectors (except perhaps those for blocks at the edge of an image) point in the direction of the camera's motion and are of equal magnitude. This allows a video coder to use standard techniques such as run length encoding to further encode the motion vectors.

Real video encoding systems, on the other hand, generate noise which may be insignificant and unnoticeable to human vision, but which may be detected and treated as real motion by the video coder during motion estimation processing. For example, noise such as that induced by automatic focusing control (AFC) can have an adverse effect on the codec bit rate by increasing the magnitude of frame difference signals.

An AFC circuit typically controls a motor used to drive a camera lens in and out to automatically maintain camera focus. Typically, a sensor device in a camera determines the approximate range to an object, typically located in the center of the field of view, which is to be filmed. The AFC circuit drives the lens in response to the estimated range to the object provided by the sensor device and includes a feedback loop which fine tunes the adjustment by, for example, constantly compensating for undershoots and overshoots. The net result of this activity is that there are certain sequences of frames where an image, especially sharp edges and small objects in an image, are successively driven into and out of focus over time, as the AFC feedback loops attempt to zero-in on the proper focus. Although AFC circuits are intended to relieve a cameraperson from a need to manually focus, which overall likely will provide video better suited for viewing, AFC can effect motion estimation processing by providing large frame difference values and consequent increased data rates.

A process and apparatus therefore are needed for characterizing the effects of AFC action on frames of video, primarily when the video is to be encoded using motion estimation, and for adjusting the video to offset the AFC induced effects.

SUMMARY OF THE INVENTION

A computer-implemented process and apparatus for encoding video. Motion estimation is performed on a sequence of images to generate a plurality of difference frames. The effects of automatic focusing control (AFC) on the sequence of images is characterized. The difference frames are adjusted to correct for the characterized AFC effects, and the adjusted difference frames are encoded.

BRIEF DESCRIPTION OF THE DRAWINGS

The following detailed description will be more fully understood with reference to the accompanying drawings in which.

DETAILED DESCRIPTION OF THE PREFERRED EMBODIMENTS

Figure 1:
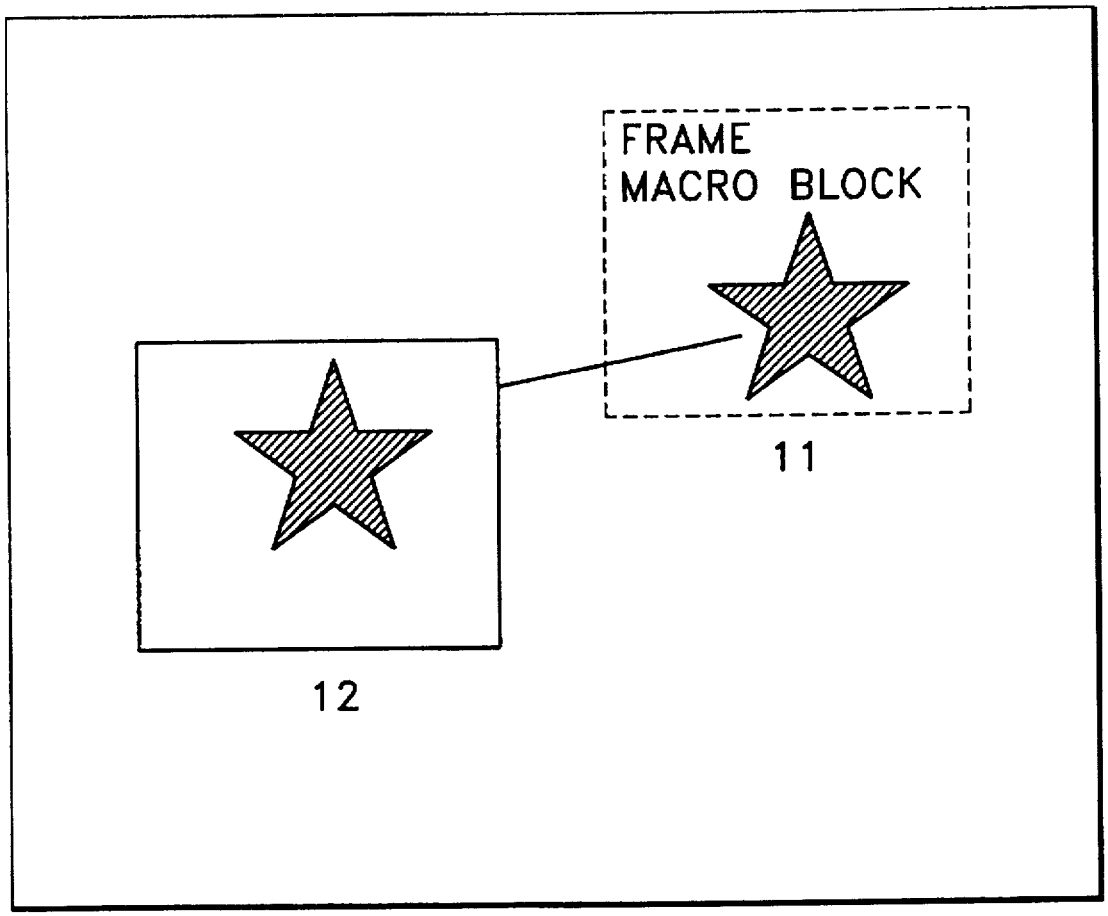
FIG. 1 is an illustration of block matching between frames.

As noted, motion estimation and motion compensation exploit the temporal correlation that often exists between consecutive video frames. As shown in FIG. 1, block 11 represents a block in a reference frame and block 12 a block in an input frame. The block in the input frame is shown in FIG. 1 to be displaced in two dimensions with respect to the same block in the reference frame as a result of object and/or camera movement. However, most of the information in the block, i.e. the pixel values, is relatively unchanged.

Figure 2:
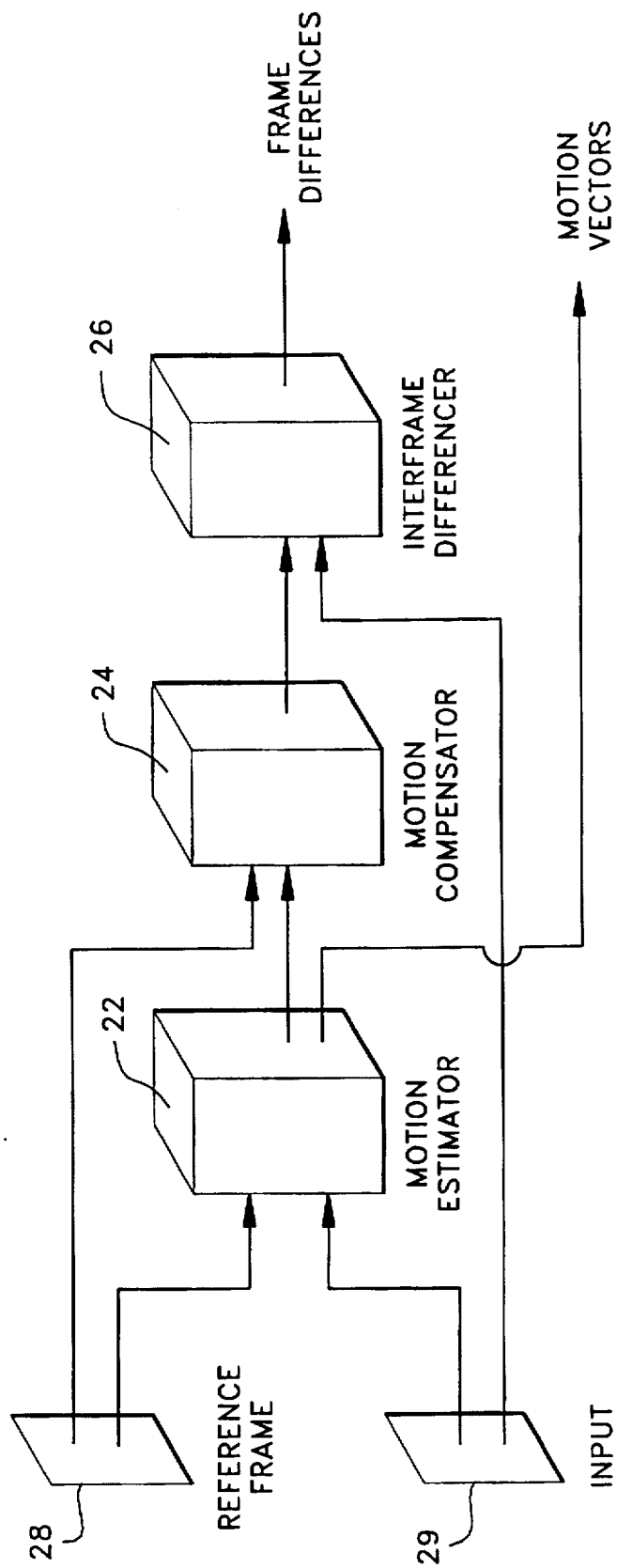
FIG. 2 is a block diagram of a prior art motion estimation video codec architecture.

Referring now to FIG. 2, there is shown typical motion estimation video codec architecture 20. Motion estimator 22 compares blocks in an input frame 29 to regions or blocks within reference frame 28, searching for a best match between blocks. This is known as block matching. Motion estimator 22 generates motion vectors corresponding to the displacement of blocks in input frame 29 from respective best-matching blocks in reference frame 28.

Motion compensator 24 applies the motion vectors generated by motion estimator 22 to corresponding blocks in reference frame 28 to generate a motion compensated frame. Motion compensator 24 essentially moves reference frame blocks into the positions which correspond to the positions in which the best matching blocks have been located in input frame 29. Interframe differencer 26 generates frame differences by subtracting the motion compensated frame from the input frame. The motion vectors and the frame differences for the various blocks may then be further encoded for transmission and/or storage.

The AFC effects on motion estimation video coding are particularly noticeable at the interframe differencer 26. At this stage in processing, the motion compensated frame output by motion compensator 24 is subtracted from input frame 29. Where no AFC action has occurred, the differences are small and only a small amount of data is required to represent the differences. Where AFC has altered the sharpness of one frame with respect to a preceding frame, frame differencer 26 will output a high difference value. This occurs because subtracting the frame with sharp features from the frame with diffused, blurred, out of focus elements will result in strong differences with high frequency energy at object edges, due to the pixel differences being located predominantly at the edges and fine points of the image.

Figure 3:
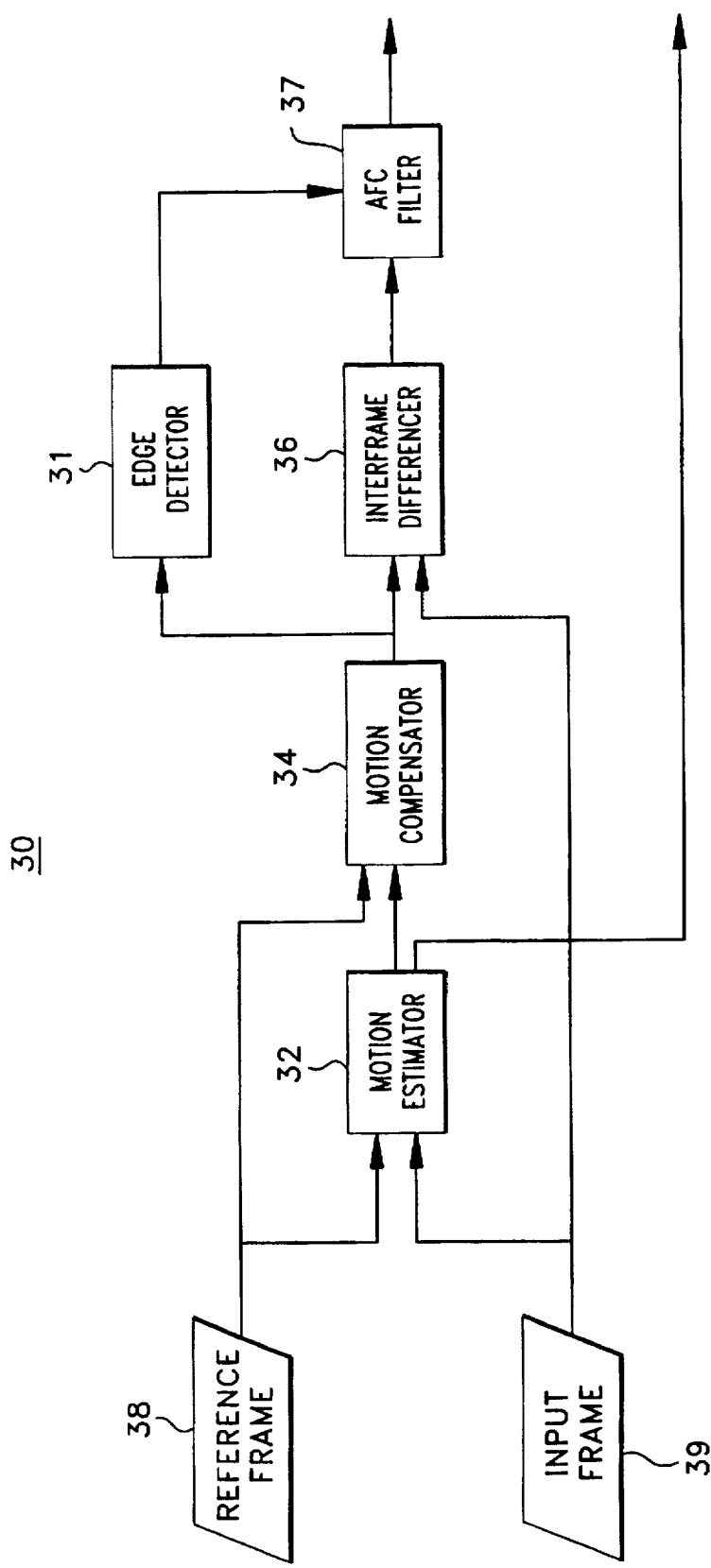
FIG. 3 is a block diagram of a preferred embodiment of the AFC compensating motion estimation video codec architecture of the present invention.
Figure 4:
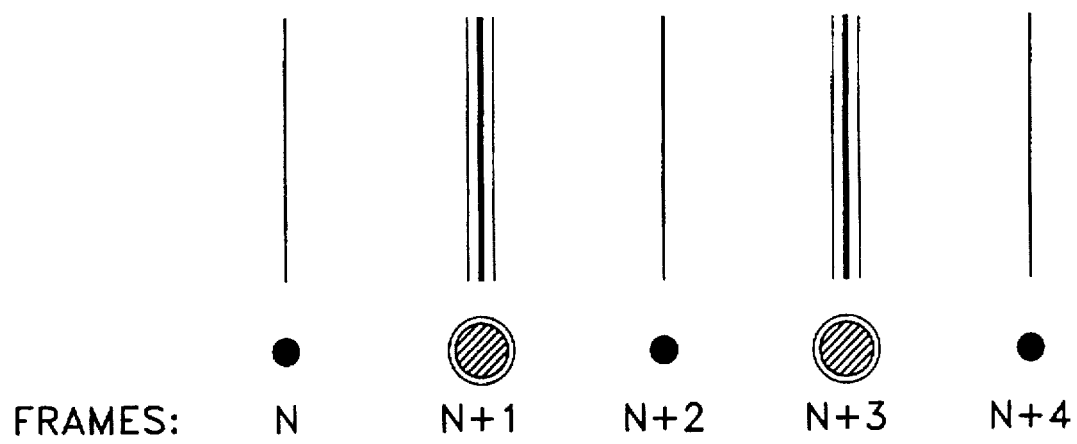
FIG. 4 is a graphic representation of AFC effects on edges and fine points through a series of frames.

Referring now to FIG. 3, there is shown a block diagram of the video codec architecture of the present invention. Video codec architecture 30 includes edge detector 31, motion estimator 32, motion compensator 34, interframe differencer 36 and AFC filter 37. AFC filter 37 preferably selectably removes most of the AFC effects from a video sequence, by adjusting the interframe difference signal output by interframe differencer 36, as described more fully below. As is well known in the art, the sequence of video frames input at 39 can include one or more key frames, i.e. frames which are not subject to video compression and which often are used as a reference for the start of a particular video scene. Preferably, AFC filtering for a sequence of video frames starts with a key frame. Referring now to FIG. 4, a first frame N includes a rather sharp and distinct vertical line as well as a sharp and defined point. Succeeding frames N+1, N+2, N+3 and N+4 show the distinct line and point fading in an out of focus; characteristic of the effects of AFC on video. Although the edges and points are blurred in some input frames with respect to others, typical motion estimators tend to ignore the differences and generally successfully generate motion vectors for reconstructing the motion compensated frame. In a like manner, the tolerance of typical edge detectors 31 enables them to identify in a sequence of video frames even those edges and points which are somewhat out of focus.

In a preferred embodiment, input frames 39 are first subjected to filtering to remove the effects that automatic gain control (AGC) circuitry might have had on the frames. A suitable method and apparatus for removing the effects of AGC are shown and described in U.S. application Ser. No. 08/513,440, filed on Aug. 10, 1995, incorporated herein by reference.

Figure 5:
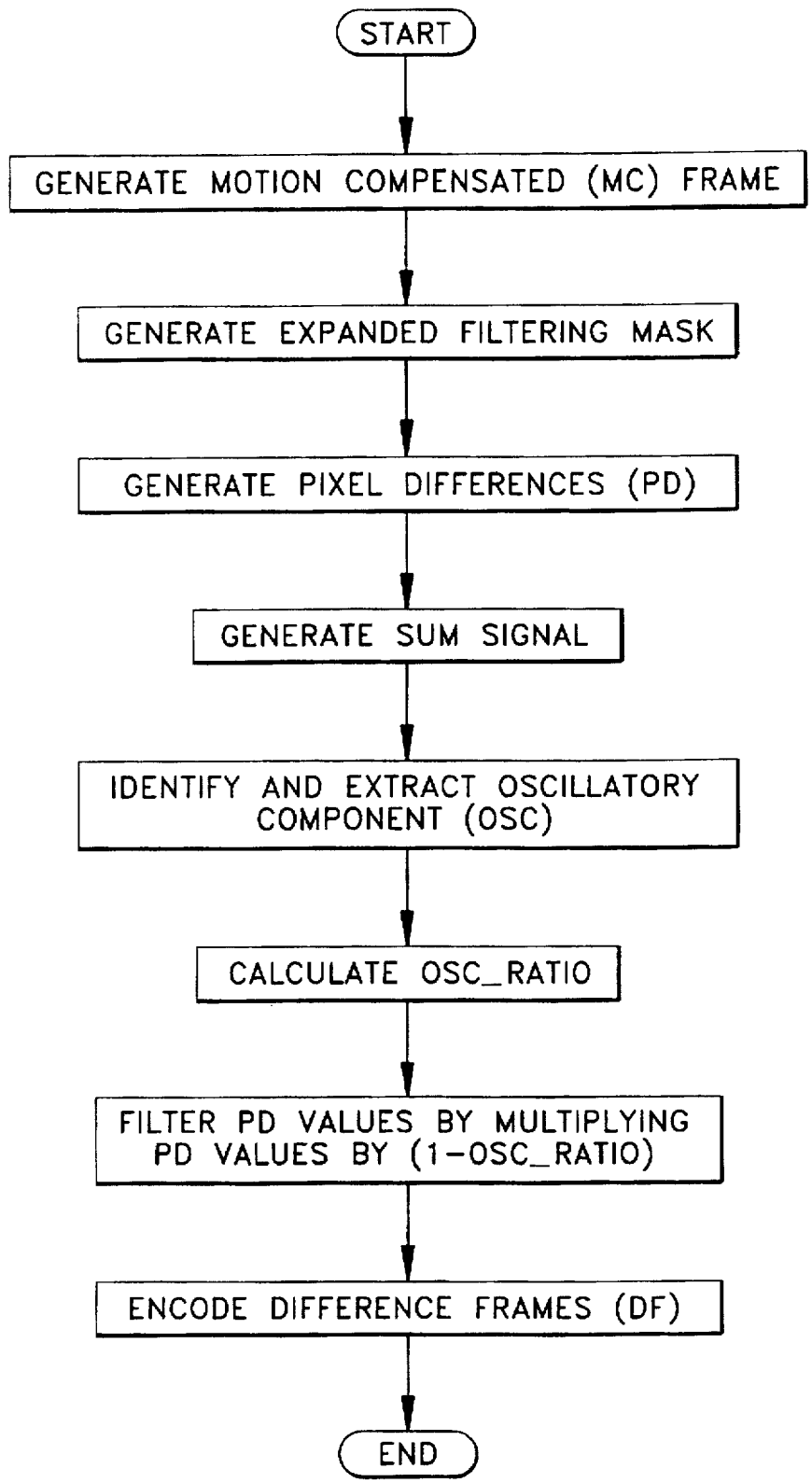
FIG. 5 is a flow chart diagram of the AFC characterization and filtering of the invention.

In a preferred embodiment, edge detector 31 uses image processing techniques known to those skilled in the art to identify the locations of strong edges and points in an image of a motion compensated reference frame (MC) generated by motion compensator 34 (step 51 of FIG. 5). Edge detector 31 creates a binary image or filtering mask (FM) which identifies the pixel locations in the MC video frame which correspond to the location of the strong edges or points. The MC frames are used since motion elements of change will have been minimized in these frames. In a preferred embodiment, the FM is created by assigning a binary "1" to those pixel position in which an edge or fine point have been identified and a binary "0" to those pixel locations not having a fine edge or point. Edge detector 31 modifies the FM by expanding the "1" valued regions outwards using known image morphology techniques to encompass pixel positions nearby edges and points which will experience some focusing-defocusing effects (step 52).

Interframe differencer 36 generates difference frames (DF) made up of pixel differences (PD) using known difference frame generating techniques (step 53). The PD values of the DF that are "on", i.e., that correspond to "1" positions in the FM, as determined by edge detector 31, are summed by AFC filter 37 to generate a SUM signal for each frame in the series of frames (step 54). The SUM signals are analyzed over time, for example by AFC filter 37, for the presence of an oscillation. An oscillation in the series of SUM signals generally defines AFC effects on the image, and particularly the edges and points identified by edge detector 31.

In the event AFC filter 37 identifies an oscillatory component in the SUM signals, that component (OSC) is extracted from each of the SUM signals (step 55). For example, OSC could be the difference between the SUM signal for a subject frame and the average of the SUM signal over the past N frames or the entirety of the sampled frames. In the preferred embodiment, AFC filter 37 calculates the ratio of OSC to the SUM of each frame to obtain an (OSC_RATIO) signal for each frame, for example OSC/SUM=(OSC_RATIO)(step 56).

The (OSC_RATIO) for each frame is used by AFC filter 37 to filter the AFC effects from the sequence of video frames (step 57). For example, AFC filter 37 multiples each of the PD in every frame where the corresponding position in the FM is "1" by the value (1-OSC_RATIO). For example, where i,j is a pixel location, if (FM(i,j)=0, then PD(i,j)=PD(i,j). If (FM(i,j)=1, then PD(i,j)=PD(i,j) * (1-OSC_RATIO)

In another embodiment of the invention, edge detector 31 is not necessary. In this embodiment, AFC filter 37 can include means for analyzing each difference frame for repeating areas of oscillating high intensity energy. These repeating areas, for example, are understood by means 52 as indicating edges or fine points in the video which have been sequentially driven into and out of focus by an AFC circuit. These frames of video are filtered by video codec architecture 30 as discussed above.

Means 52 is capable of distinguishing random AFC effects on video from those that are desired and under the control of, for example, a video cameraperson. It is known, for example, for a cameraperson to purposely slowly focus or defocus a scene to achieve a desired visual effect. Typically in such cases, the cameraperson moves the lens in a single direction, either in or out, to achieve the desired focusing effect. In these cases, the lens is not being driven back and forth through the proper focal length, as occurs when an AFC circuit is active, and consequently there will be no oscillatory component to the sum signal. Video codec architecture 30 therefore can be constructed to refrain from filtering intended focusing effects from video data, which generally are devoid of oscillating high frequency energy, especially along edges and at fine points.

The invention advantageously identifies that an AFC filter has affected motion estimation video data, more particularly the difference frames generated by motion estimation video coders, and filters the difference frames to limit the adverse effect of the AFC action. A number of possible embodiments of the invention are shown and described above. Further embodiments are possible. For example, both vertical and horizontal edges can be identified by edge detector 31 and subsequently studied for evidence of AFC action. Furthermore, filtering step 57 can entail simply discarding the difference frame data, wherein the sequence of video frames are encoded motion compensation frames. This method is especially effective where motion estimator 32 generates accurate motion vectors.

The invention therefore reduces the bit rate of a motion estimation video coder by filtering data representing difference frames to remove unnecessary data which otherwise would be processed, such as encoded, transmitted and/or stored.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

When implemented on a general-purpose microprocessor, the computer program code segments configure the microprocessor to create specific logic circuits.

Furthermore, it should be understood that various changes in the details, materials, and arrangements of the parts which have been described and illustrated in order to explain the nature of this invention may be made by those skilled in the art without departing from the principle and scope of the invention as expressed in the following claims.

What I claim is:

1. A computer-implemented process for encoding video, comprising the steps of:
    (a) performing motion estimation on a sequence of images to generate a sequence of motion compensated frames and difference frames, the difference frames being comprised of pixel differences;
    (b) characterizing the effects of automatic focusing control in the sequence of difference frames;
    (c) adjusting at least one frame of the sequence of difference frames to correct for the characterized effects of automatic focusing control; and
    (d) encoding the at least one adjusted difference frame.

2. The process of claim 1, wherein step (b) comprises the step of:
    (1) identifying one or more edges in the sequence of difference frames.

3. The process of claim 1, wherein step (b) comprises the steps of:
    (1) identifying one or more points in the sequence of difference frames; and
    (2) generating a binary filtering mask corresponding to the one or more points.

4. The process of claim 2, wherein step (b) further comprises the steps of:

(2) generating a binary filtering mask corresponding to the one or more edges; and
    (3) expanding the binary filtering mask.

5. The process of claim 2, wherein the one or more edges are stationary.

6. The process of claim 2, wherein the sequence of images are first filtered before performing motion estimation to remove effects of automatic gain control.

7. The process of claim 2, wherein step (b) further comprises the steps of:
    (3) summing the pixel differences in each difference frame which correspond to an identified edge to generate a series of sum signals, each of the series of sum signals corresponding to one of the sequence of difference frames; and
    (4) analyzing the series of sum signals for the presence of an oscillation.

8. The process of claim 7, wherein step (c) comprises the steps of:
    (1) extracting an oscillation component from at least one of the series of sum signals; and
    (2) generating an oscillation ratio for the at least one of the series of sum signals.

9. The process of claim 8, wherein step (c)(2) comprises the step of:
    (i) dividing the oscillation component by the at least one of the series of sum signals.

10. The process of claim 8, wherein step (c) further comprises the step of:
    (3) using the oscillation ratio to adjust the corresponding difference frame.

11. The process of claim 10, wherein step (c)(3) comprises the step of:
    (i) multiplying the pixel differences in the difference frame which correspond to an identified edge by the value of 1 minus the oscillation ratio.

12. The process of claim 1, wherein step (b) further comprises distinguishing the effects of automatic focusing control from the effects of operator controlled focus adjustments.

13. The process of claim 1, wherein step (c) comprises the step of:
    (1) discarding at least one frame of the sequence of difference frames.

14. An apparatus for encoding video, comprising:
    (a) means for performing motion estimation on a sequence of images to generate a sequence of motion compensated frames and difference frames, the difference frames being comprised of pixel differences;
    (b) means for characterizing the effects of automatic focusing control in the sequence of difference frames;
    (c) means for adjusting at least one frame of the sequence of difference frames to correct for the characterized effects of automatic focusing control; and
    (d) means for encoding the at least one adjusted difference frame.

15. The apparatus of claim 14, wherein means (b):
    (1) identifies one or more edges in the sequence of difference frames.

16. The apparatus of claim 14, wherein means (b):
    (1) identifies one or more points in the sequence of difference frames; and
    (2) generates a binary filtering mask corresponding to the one or more points.

17. The apparatus of claim 15, wherein means (b) further:

(2) generates a binary filtering mask corresponding to the one or more edges; and (3) expands the binary filtering mask.

18. The apparatus of claim 15, wherein the one or more edges are stationary.

19. The apparatus of claim 15, wherein the sequence of images are first filtered before performing motion estimation to remove effects of automatic gain control.

20. The apparatus of claim 15, wherein means (b) further:

(3) sums the pixel differences in each difference frame which correspond to an identified edge to generate a series of sum signals, each of the series of sum signals corresponding to one of the sequence of difference frames; and (4) analyzes the series of sum signals for the presence of an oscillation.

21. The apparatus of claim 20, wherein means (c):

(1) extracts an oscillation component from at least one of the series of sum signals; and (2) generates an oscillation ratio for the at least one of the series of sum signals.

22. The apparatus of claim 21, wherein means (c)(2):

(i) divides the oscillation component by the at least one of the series of sum signals.

23. The apparatus of claim 21, wherein means (c) further:

(3) uses the oscillation ratio to adjust the corresponding difference frame.

24. The apparatus of claim 23, wherein means (c)(3):

(i) multiplies the pixel differences in the difference frame which correspond to an identified edge by the value of 1 minus the oscillation ratio.

25. The apparatus of claim 14, wherein means (b) distinguishes the effects of automatic focusing control from the effects of operator controlled focus adjustments.

26. The apparatus of claim 14, wherein means (c):

(1) discards at least one frame of the sequence of difference frames.

27. A storage medium encoded with machine-readable computer program code for encoding video, comprising:

(a) means for causing a computer to perform motion estimation on a sequence of images to generate a sequence of motion compensated frames and difference frames, the difference frames being comprised of pixel differences;

(b) means for causing the computer to characterize the effects of automatic focusing control in the sequence of difference frames;

(c) means for causing the computer to adjust at least one frame of the sequence of difference frames to correct for the characterized effects of automatic focusing control; and (d) means for causing the computer to encode the at least one adjusted difference frame.

28. The storage medium of claim 27, wherein means (b):

(1) identifies one or more edges in the sequence of difference frames.

29. The storage medium of claim 27, wherein means (b):

(1) identifies one or more points in the sequence of difference frames; and (2) generates a binary filtering mask corresponding to the one or more points.

30. The storage medium of claim 28, wherein means (b) further:

(2) generates a binary filtering mask corresponding to the one or more edges; and (3) expands the binary filtering mask.

31. The storage medium of claim 28, wherein the one or more edges are stationary.

32. The storage medium of claim 28, wherein the sequence of images are first filtered before performing motion estimation to remove effects of automatic gain control.

33. The storage medium of claim 28, wherein means (b) further:

(3) sums the pixel differences in each difference frame which correspond to an identified edge to generate a series of sum signals, each of the series of sum signals corresponding to one of the sequence of difference frames; and (4) analyzes the series of sum signals for the presence of an oscillation.

34. The storage medium of claim 33, wherein means (c):

(1) extracts an oscillation component from at least one of the series of sum signals; and (2) generates an oscillation ratio for the at least one of the series of sum signals.

35. The storage medium of claim 34, wherein means (c)(2):

(i) divides the oscillation component by the at least one of the series of sum signals.

36. The storage medium of claim 34, wherein means (c) further:

(3) uses the oscillation ratio to adjust the corresponding difference frame.

37. The storage medium of claim 36, wherein means (c)(3):

(i) multiplies the pixel differences in the difference frame which correspond to an identified edge by the value of 1 minus the oscillation ratio.

38. The storage medium of claim 27, wherein means (b) distinguishes the effects of automatic focusing control from the effects of operator controlled focus adjustments.

39. The storage medium of claim 27, wherein means (c):

(1) discards at least one frame of the sequence of difference frames.

* * * * *